April 19, 1955 E. J. SPERBER 2,706,787

SIGNAL SEEKING TUNING SYSTEMS

Filed July 30, 1949 2 Sheets-Sheet 1

INVENTOR
EDWARD J. SPERBER
BY H. L. Newton
ATTORNEY

INVENTOR
EDWARD J. SPERBER
BY H. L. Newton
ATTORNEY

United States Patent Office 2,706,787
Patented Apr. 19, 1955

2,706,787

SIGNAL SEEKING TUNING SYSTEMS

Edward J. Sperber, Philadelphia, Pa., assignor to Radio Corporation of America, a corporation of Delaware Application July 30, 1949, Serial No. 107,775

11 Claims. (Cl. 250—40)

This invention relates to signal-seeking tuner systems for radio receivers and the like, and more particularly to electro-mechanical tuning devices or mechanisms therefor.

Prior known tuner systems of the signal-seeking type have been provided with various types of tuning mechanisms for effecting selective scanning of a desired signal frequency band, with automatic stopping when a suitable signal was received. In general, prior tuning mechanisms have involved relatively complicated and costly structural and operating elements, for example as exemplified in U. S. Patent No. 2,426,580 to O'Brien, or they have a tendency to be relatively unreliable in use.

It is accordingly a principal object of the present invention, to provide improved signal-seeking tuner mechanism that is of simplified, low-cost construction and relatively reliable and positive in operation at all times.

A further object of the invention, is to provide an improved signal-seeking tuner mechanism having an improved combined automatic scanning drive and manual tuning arrangement.

It is also an object of the invention, to provide an improved signal-seeking tuner mechanism incorporating a manual tuning arrangement that can be operated without interference by automatic signal seeking mechanism.

The above as well as further objects of the invention, will be more readily understood from the following description of exemplifications thereof, reference being had to the accompanying drawings, wherein.

Figures 1, 2:
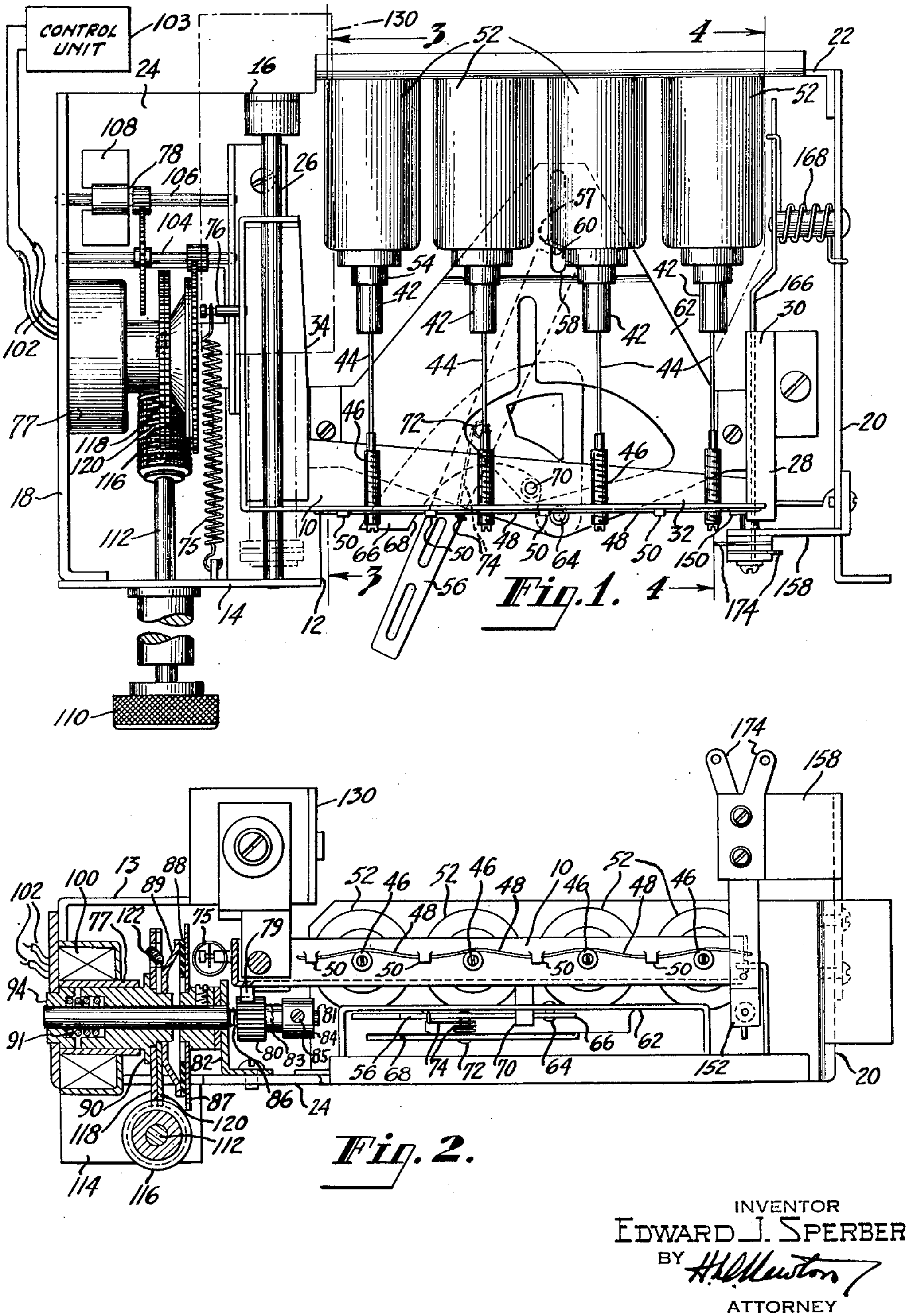
Figure 1 is a plan view of a signal-seeking tuner mechanism embodying the invention, certain elements being removed to show the operational features thereof.
Figure 2 is a front elevation, partly in section, of the tuner mechanism of Figure 1.
Figure 3:
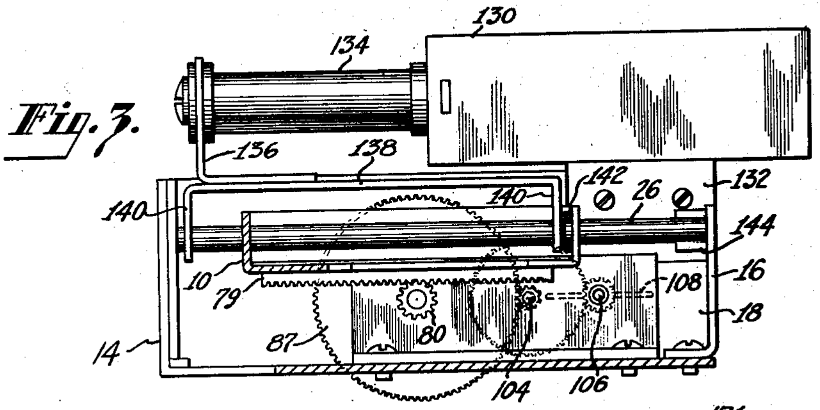
Figure 4:
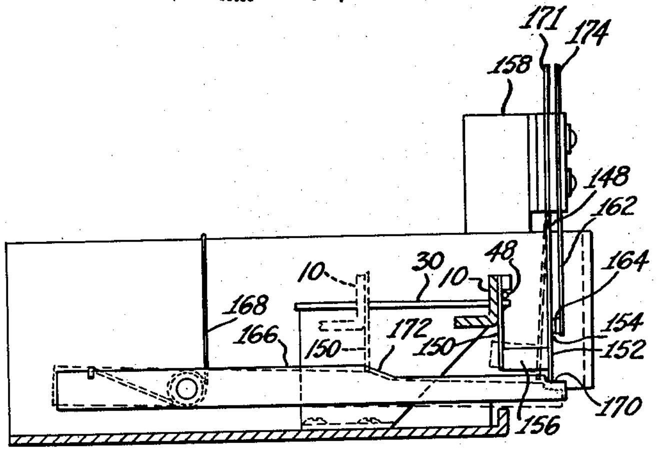
Figures 5, 6:
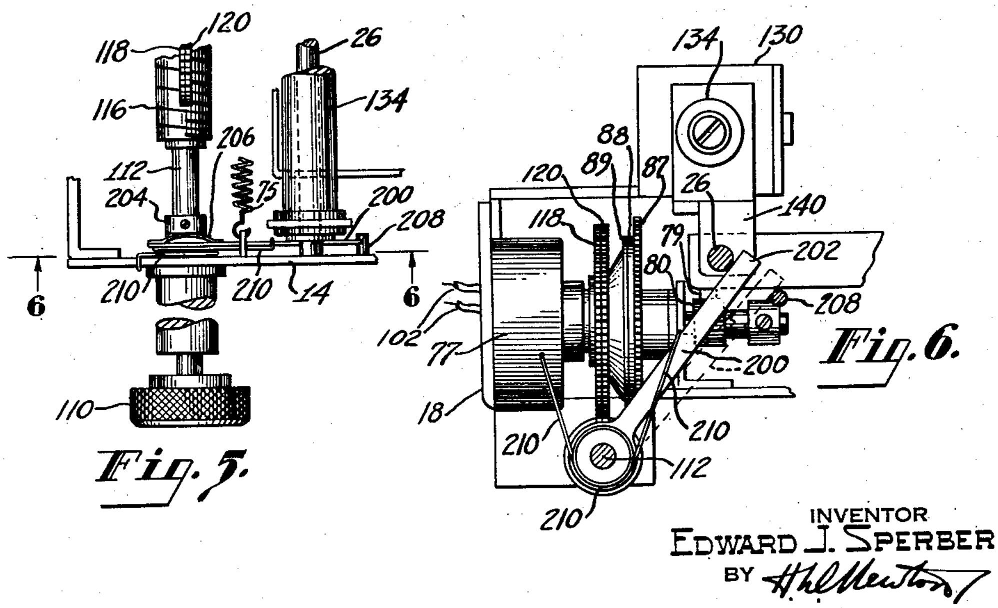

Figures 3 and 4 are sectional views of the mechanism of Figures 1 and 2, taken along the lines 3—3 and 4—4 respectively, to show certain features thereof in greater detail;

Figure 5 is a plan view of detail of the mechanism of Figure 1 showing a modification of the invention; and Figure 6 is a view in elevation and partly in section of the structures shown in Figure 5, taken on line 6—6, to show further features thereof.

According to the present invention, a signal-seeking tuner mechanism is provided with a scanning drive means in the form of a mechanical linkage and a spring-actuated driving device, and includes control elements arranged automatically to stop the scanning when the receiving apparatus with which it is used reaches a tuned condition in which desired signals are received. A solenoid device is connected for periodically supplying scanning energy to the spring-actuated drive system, as by automatically returning the driving device to one end of a scanning range when it reaches the other end. To reduce the scanning speed and make it more uniform, a loading device such as an air governor is connected to be driven along with the tuning elements of the system. Arresting mechanism, responsive to received signals is connected to frictionally engage the movable tuning elements with a selectably adjustable brake member forming part of a manually tuning assembly, so that the apparatus can be manually tuned at any time between signal seeking operations, without special manipulation. For preventing interference with the manual tuning by automatic scan returning devices, whether of solenoid or other types, blocking structure is used to prevent actuation of the automatic return during manual tuning.

Referring to Figures 1 to 4 inclusive in which like reference characters designate like elements throughout, a presently preferred form of signal-seeking tuner mechanism embodying the invention as shown therein, has a tuning carriage 10 slidably mounted in a framework 12 that includes a front wall 14 and a rear lug 16, as well as a rear wall 22, side walls 18, 20 and a floor 24. Between the front wall 14 and the rear lug 16, a guide rod 26 is secured at one side of the carriage. Fastened to the floor 24 on the other side of the carriage is a guide plate 28 carrying a horizontal guide flange 30. The carriage 10 is of generally L-shaped construction including a forward section 32 and a body section 34, each of angular cross-section having horizontal and vertical walls. The vertical walls of the carriage body section 34 have openings which receive the guide rod 26 and slidably hold the carriage on it. At the outer end of the forward section 32, the vertical wall of the carriage is horizontally slotted and receives the horizontal guide flange 30 in this slot to cooperate in the slidable guiding.

The vertical wall of the forward carriage section 32 also carries a set of tuning cores 42 which are held by connecting wires 44 to adjusting screws 46 threadedly received in the carriage. The screws are frictionally held against inadvertent rotation, by the spring wire 48 resiliently biased between the screw threads and lugs 50 struck out of the carriage wall. The cores 42 move with the carriage 10 and are slidably received in inductance windings (not shown) held within individual shield cans 52 as by coil forms 54. The cans 52 are suitably secured to the rear wall 22 of the framework. As the cores move to varying degrees of penetration within the respective windings, the inductance of these windings change. By connecting the windings in signal selecting circuits, the signal frequencies selected are correspondingly changed.

The specific form of signal selecting circuits used forms no part of the present invention. A typical circuit in which a selector capacitance is changed instead of an inductance, is shown in the above identified O'Brien patent, but the same principles apply. Although four adjustable elements are shown as gang tuned in the construction of Figure 1, a fewer or greater number may be used, as desired.

To indicate the position of the carriage along the tuning range, there is shown a movable pointer arm 56 having a rearward portion upstanding ear 57 necked down at 60 and slidably and pivotally held in a slot 58 provided on a stepped indicator guide plate 62 fastened to the framework floor 24. The guide plate 62 also has pivoted to it as by rivet 64 a cam plate 66 having a suitably shaped cam edge 68 against which is engaged a pin 70 depending from carriage 10. The cam plate 66 is in turn pivoted to the pointer arm 56, as shown at 72. For assuring proper contact of pin 70 with cam edge 68, a spring 74 is shown as coiled around pin 72 with ends hooked around the arm 56 and an aperture in cam plate 66 to bias the arm in a clockwise direction as seen in Figure 1. This urges the cam plate in a counterclockwise direction around its pivot pin 64, keeping the cam edge 68 in position against the carriage pin 70. Accordingly, as the carriage 10 is slid back and forth along its tuning path, the pointer arm will be swung to and fro across the front of the framework where a suitable scale can be readily provided.

To move the carriage along its tuning path for scanning the desired signal frequencies, a drive spring 75 is hooked between the front framework wall 14 and a pin 76 held on the carriage. Control of the scanning is provided by a magnetic type clutch 77 and an air governor 78. A rack 79 secured to the lower surface of the carriage engages a pinion gear 80 pivotally held on a shaft 81 rotatably mounted in bearings provided in framework side wall 18 and an auxiliary wall support 82 anchored to the framework. The pinion 80 has at one side a ratchet drive connection 83 with a collar 84 fixed on shaft 81 as by set screw 85. The ratchet drive 83 is engaged under the influence of spring 86 sandwiched between the pinion and an enlarged shoulder on the shaft, and permits relatively free rearward travel of the carriage. During such travel the ratchet drive causes the pinion gear 80 to be rotated without driving shaft 81. Forward movement of the carriage on the other hand, is effected with the pinion in positive non-slip engagement with collar 84.

Affixed to the shaft 81 is a clutch plate gear 87 which carries a friction disc 88. A cooperating slidable clutch plate 89 is held on an armature 90 that forms part of the magnetic elements of clutch 77 and is slidably held on shaft 81. A clutch engaging spring 91 biases the armature away from a cooperating bearing portion 94 of the magnetic clutch to keep the clutch plates 87, 89 in frictional engagement.

The clutch assembly also includes magnet windings 100 that surround the junction of the armature 90 and bearing portion 94 and have leads 102 through which they are electrically energized by a signal seeking control unit 103 to generate magnetic flux. Under the influence of this flux the armature 90 is attracted toward bearing portion 94, compressing spring 91 and disengaging the clutch plates 87, 89 from each other.

Clutch gear 87 forms part of a gear train including step-up gears on a countershaft 104 pivoted in the walls 18, 82 which rotate a governor shaft 106, similarly pivoted, at a high speed whenever shaft 81 is rotated as by the contraction of drive spring 75. Shaft 106 carries air vanes 108, which at the high rotation speed encounter considerable air resistance. This makes so much resistance for the drive spring to overcome, that the spring actuated scanning movement of the carriage is made more gradual. At the same time the carriage movement is rendered somewhat more uniform. Without the air governor, the spring would have substantially no loading so that it would completely contract itself in a fraction of a second. With the governor, the scanning can be extended over a period of the order of ten seconds or more.

The tuner construction also includes a manual tuning control knob 110 which is mounted for rotating a manual tuning shaft 112 pivotally held between ears 114 struck down from the framework floor 24. The manual tuning shaft carries a worm 116 that meshes with a worm gear 118 fixed to the magnet armature 90. To reduce any play in the manual worm gear connection, an auxiliary floating gear 120 alongside the fixed gear 118 also meshes with the worm 116 and is urged into offset rotatory position with respect to the fixed gear by one or more coil springs 122, as is well known. The worm 116 may have a steeply pitched thread, as by arranging its thread in double, triple or quadruple form to simplify the manual tuning so that less turning of the knob 110 is needed to shift the carriage.

Provision is also made for periodically imparting additional energy to the drive spring 75 and thereby enable repeated spring-actuated scanning operations. As more clearly shown in Figures 2 and 3, a solenoid 130 is mounted over the guide rod 26 by an outwardly extending integral bracket 132 secured to the framework wall 18. The solenoid includes a plunger 134 which is connected by link 136 to a U-shaped slide 138 having terminal arms 140 slidably received on the guide rod 26. At least one of these arms is positioned to engage a wall of carriage 10 so that rearward travel of the plunger will carry the carriage 10 rearwardly also. Damping washer 142 is shown as interposed to reduce the noise at the contacting of the solenoid-actuated slide 138 with the carriage.

For fixing the rearward limit of carriage movement and thereby cause the scanning to always begin at approximately the same position, a resilient washer 144 is interposed between the rear of the carriage body and the rear lug 16. This washer is arranged to have a thickness which defines the desired spacing, while the solenoid is arranged to move the carriage far enough to compress the washer somewhat. Upon deenergization of the solenoid, the washer 144 will return to its normal shape and accordingly carry the carriage to the desired position, the clutch 77 slipping to permit this adjustment.

In the form shown in the drawings, the solenoid 130 has windings arranged to be energized by the carriage so that when the carriage reaches its forward limit of scanning travel, the solenoid automatically retracts it to the rearward scanning limit. This simultaneously stretches the drive spring 75 so that another scanning cycle can be effected.

As more clearly shown in Figure 4, the carriage 10 has a downwardly extending lug 150 positioned to engage and push forward a movable switch blade 152 of switch 148 when the carriage reaches its forward travel limit. The movable blade 152 may be of spring metal carrying a switch contact 154 and a protruding bumper 156, and is held by an insulated mount on a bracket 158. This bracket is secured to the tuner framework and also carries a cooperating springy switch blade 162 which holds a corresponding contact 164. The lower end of blade 152 cooperates with a trip lever 166 pivotally held on the framework for vertical tilting. A bias spring 168 urges the forward end of the trip lever upwardly toward the lower edge of blade 152.

The various parts occupy the dash-line positions in which they are shown in Figure 4, when the carriage is at its rearmost limit. The forward end of the trip lever 166 is held down by the lower end of lug 150 so that it is out of engagement with blade 152. At the same time 152 assumes its normal position at which its lower edge is above a shoulder 170 on the upper part of the forward end of trip lever 166. The shoulder 170 is set back far enough to permit the lower edge of blade 152 to be pushed off it by the lug 150 as it reaches its forward limit position as shown by the full lines in Figure 4. The lever also carries at its upper edge a cam slope 172 immediately in front of the rearward limit position of lug 150. Terminal connection portions 174 extend upwardly from the blades 152, 162.

In use the windings of solenoid 130 are connected through switch 148 to a source of actuating power, such as the battery of an automobile in which the radio carrying the tuner of the invention is mounted. The signal-seeking control unit 103 may be of the type shown in the above-identified O'Brien patent or in Andrews Patent No. 2,304,871 granted December 15, 1942. These energizing sources are arranged to provide clutch energizing current whenever a signal-seeking operation is to be initiated, and to keep supplying this current until the tuning brings in a desired signal at which time the current is automatically terminated.

With the tuner carriage at its rearmost position and no signal-seeking being effected, magnetic clutch windings 100 are de-energized and the clutch spring 91 keeps the clutch plates 87, 89 frictionally engaged so that the manual worm gear drive 118—116 keeps the carriage from moving forward under the influence of the drive spring 75. When a signal-seeking is initiated, the clutch windings 100 are energized, disengaging plates 87, 89 and the carriage is accordingly pulled forward by spring 75. The air governor 78 keeps the forward movement relatively slow so that when a signal of the desired intensity is tuned in, the simultaneous de-energization of the clutch 77 will cause the plate 89 to act as a brake, stopping the forward carriage movement with substantially no overrun.

As the carriage moves forward, the lug 150 comes down the cam slope 172 of trip lever 166 permitting the shoulder 170 to move upwardly somewhat to engage the lower end of blade 152. When the carriage reaches its forward limiting position, the lug 150 engages bumper 156 thereby pushing blade 152 toward blade 162 and bringing contacts 154, 164 into engagement. This energizes the solenoid 130 and at the same time pushes blade 152 off shoulder 170 allowing the trip lever 166 to move the shoulder upwardly holding the switch blades together. The solenoid rapidly carrries the carriage 10 back to its rearmost position, the ratchet drive 83 permitting the rearward travel without interference by the clutch or manual tuning mechanism. The trip lever 166 holds the switch blades together until the carriage reaches its rearward limiting position, when the lug 150, by engaging cam slope 172, tilts the trip shoulder 170 down away from blade 152, permitting this blade to return to its normal or dash-line position. The switch contacts 154, 164 thereby separate de-energizing the solenoid 130 and the tuner is ready for further signal-seeking. If the carriage return occurs during a signal-seeking operation, the seeking will continue after the return, inasmuch as the magnetic clutch 77 will still remain energized and disengaged until a desired signal is tuned in. The carriage return is so rapid that any signals that may be received in this interval will be of such short duration as not to interrupt the energization of the magnetic clutch 77.

If desired, however, the tuner may also include a muting switch operated simultaneously with the limit switch to interrupt the supply of signals to the signal-seeking mechanism during the solenoid operation and thereby assure the maintenance of clutch energization during the retrace. This has the further advantage of enabling simple elimination of all receiver output noises during the retrace when the jumble of sound produced would be annoying to listen to.

An important feature of the present invention, aside from the inexpensive scan driving mechanism, is the use of a manual tuning assembly as part of the signal responsive scan arresting elements. This not only simplifies the combined construction but enables manual tuning at all times when there is no signal-seeking, and does not require the manipulation of special function switch-over members to change from seeking to manual tuning or vice versa.

A further feature of the invention is the prevention of undesirable retracing, as for example during manual tuning of the carriage adjacent to its forward limit position. If no special precautions are taken, an operator may find that, upon attempting to accurately tune in signals at 1590 kilocycles per second with the one-way retrace mechanism set to trip at a position corresponding to about 1630 kilocycles per second in the standard broadcast range, the carriage is suddenly and uncontrollably yanked back to the low frequency end so that it becomes necessary to start tuning all over again.

To prevent such disconcerting action, the tuner is arranged so that it is impossible to energize the solenoid 130 when it is manually tuned. By way of example, a control switch responsive to manual tuning operation, as described in U. S. Patent No. 2,049,809, granted August 4, 1936 to E. W. Kellogg may be connected in the solenoid energizing circuit. This switch is connected with the manual tuning shaft so as to open the energizing circuit whenever the shaft is being rotated, but to close this circuit when the rotation stops.

Figures 5 and 6 show another embodiment of the invention in which a mechanical retrace-preventing mechanism is provided. Here the tuner may in general be of the same construction described above in connection with Figures 1 to 4, but includes a blocking or stop lever 200 pivotally mounted at one end on the manual tuning shaft 112 and having an outer end or nose 202 projecting in the general direction of the guide rod 26. The pivoted end is held between two shaft collars 204, at least one of which is in frictional engagement with it, as by the interposed cupped spring washer shown at 206.

A pin 208 fastened to the front wall 14 forms a rest against which the nose 202 is normally held, as by the spring 210, when the manual tuning shaft 112 is not actuated. Movement of the shaft in the counterclockwise direction, as seen in Figure 6, causes the lever 200 to be dragged around by reason of the frictional engagement with the collars 204, lifting the nose 202 into the path of solenoid slide arm 140. When the shaft stops turning, the nose is retracted by spring 210. The counterclockwise rotation of shaft 112 causes the carriage to be moved forward toward the front limiting position at which the limit switch 148 would be actuated. However, due to the interposition of nose 202, the arm 140 which is moved forward by the carriage, is prevented from travelling far enough to cause the limit switch to be tripped. Accordingly, it will be substantially impossible to inadvertently bring about a carriage retrace while manually tuning the unit. If desired, the engaging faces of nose 202 and/or arm 140 may be tapered to assure that the nose will wedge itself into carriage-blocking position, even though manual tuning is started in the forward direction after the carriage has already reached the forward limit defined by the nose 202 in the position shown in Figure 6. The small amount of additional forward carriage movement that will take place before the nose 202 again reaches the arm from the rest position against pin 208 to which it has meanwhile been restored, will by this technique not prevent the nose from returning to a blocking position.

The guide bar 26 acts as an upper limit stop for the nose 202 so that the lever 200 is kept in place. Where the forward carriage movement is effected by clockwise rotation of shaft 112, the lever nose 202 may be placed on the other side of the guide bar 26. If desired, the retraction of the nose may be effected entirely under the influence of gravity, in which case spring 210 is omitted.

The retrace-preventing feature of the present invention may be used with any other form of signal-seeking drive arrangement where the retrace is not reversible and could interfere with manual tuning.

What is claimed is:

1. In a signal seeking tuning system having signal selecting apparatus for selectively scanning a tuning range and automatically stopping when the scanning reaches tuning positions at which desired signals are received; a tuning element; carriage mechanism connected to said tuning element to move the same along a predetermined path; a driver for driving said carriage mechanism, the said driver comprising an energy storage device connected to said carriage mechanism and to a fixed point outside of said mechanism, and a signal responsive means for actuating said driver, the said signal responsive means comprising a magnetically operable clutch having a solenoid and manually operable tuner, one part of said clutch being mechanically coupled to a portion of the said carriage mechanism, and another part of said clutch being coupled to the said manual tuner and to the solenoid, whereby said clutch allows said driver to drive said carriage mechanism unidirectionally when scanning a tuning range and allows said manually operable tuner to arrest movement of said guide mechanism when a desired signal is reached.

2. The combination as claimed in claim 1 and including an air governor mechanically coupled to said carriage mechanism to regulate the speed of same when scanning.

3. The combination as claimed in claim 1 and including a second solenoid having an armature, said armature being connected to said driver to restore energy to the said driver, and a switch mechanism connected to said last mentioned solenoid to maintain the same energized until energy is fully restored to said driver.

4. The combination as claimed in claim 1 wherein said manually operable tuner includes a worm gear mechanically coupled to the second portion of said clutch, said clutch allowing movement by said manually operable tuner of said driving structure independently of said solenoid.

5. A signal seeking tuning assembly having a signal selecting apparatus for selectably scanning a tuning range and automatically stopping at desired positions at which desired signals are reached, comprising a magnetic clutch incorporating means responsive to received signals, a manually operable tuner mechanically coupled to a portion of said clutch, a carriage coupled to another portion of said clutch, a spring attached to said carriage to drive the same, a guide element on which the carriage is adapted to slide and be guided when driven by said spring, and the said tuner including an element attached to said carriage whereby said carriage when driven by said spring brings said tuning element to a desired tuned position, and said clutch including means to allow said spring to drive said carriage, and to operate to engage said manual tuner when tuned position is reached, said manual tuner thereby forming a brake for said carriage.

6. The combination as claimed in claim 5 and including a solenoid attached to said spring to return said carriage to an initial position, a switch connected to said solenoid whereby said solenoid is energized when said switch is actuated by said carriage, and a lever connected to said switch and said carriage to maintain said solenoid energized until said carriage reaches its original position.

7. The combination as claimed in claim 6 wherein said manually operable tuner includes a lever pivoted on said tuner to swing between the carriage and switch to prevent said solenoid from energizing when said tuner is operated manually.

8. A signal seeking assembly having a signal selecting apparatus for selectably scanning a tuning range and automatically stopping at desired positions at which desired signals are reached comprising a base; a carriage slidably mounted on said base; tuning elements attached to said base and said carriage whereby sliding movement of said carriage causes the tuning elements to operate; a spring attached at one end to the base and at another end to said carriage to drive said carriage unidirectionally; a magnetic clutch responsive to received signals mounted on said base mechanically coupled to said carriage, said clutch having a solenoid, a rotatable armature, and a plurality of disks, one of said disks being fixedly attached to said carriage and another of said discs being fixedly attached to said armature, and said solenoid including means operating to cause said disks to engage and disengage each other; a manually operable tuner mounted on said base and coupled to the second mentioned disk, whereby said carriage when driven by said spring is stopped by said manually operable tuner when said solenoid in response to said signals causes said disks to contact each other, and whereby said armature allows said manually operable tuner to motivate said carriage independently of said solenoid.

9. The combination as claimed in claim 8 and including an air brake mechanically coupled to said carriage to regulate movement thereof when driven by said spring.

10. The combination as claimed in claim 8 and including a second solenoid having an armature, said solenoid being mounted on said base, and said armature being mounted on said carriage whereby said armature in response to energy received in said solenoid operates to return said carriage to an initial driving position; a switch mechanism mounted on said base connected in the circuit of said second solenoid, and a lever means connected to the base and operating to hold said switch in its closed position until said carriage is returned by said armature to its original position.

11. In a signal seeking tuner, tuning means; mechanical means connected to said tuning means for driving the same in one direction; electrical means associated with said tuning means for driving the same in an opposite direction; manual driving means disengageably connected to said tuning mechanism for driving the same; means whereby said manual driving means is disconnected from said tuning means during mechanical or electrical driving of said tuning means; and means whereby said manually operable driving means will act as a positive brake upon re-engagement with said tuning means when said tuner reaches a tuning position at which desired signals are received.

References Cited in the file of this patent

UNITED STATES PATENTS

| | | |
|---|---|---|
| 1,968,302 | Maurer | July 31, 1934 |
| 2,049,809 | Kellogg | Aug. 4, 1936 |
| 2,205,097 | Knos et al. | June 18, 1940 |
| 2,304,871 | Andrews | Dec. 15, 1942 |
| 2,426,580 | O'Brien | Aug. 26, 1947 |
| 2,453,252 | Newman | Nov. 9, 1948 |
| 2,493,741 | Andrews | Jan. 10, 1950 |
| 2,511,580 | Goodrich | June 13, 1950 |
| 2,512,714 | Carlzen | June 27, 1950 |